United States Patent
Gupta et al.

(10) Patent No.: US 12,079,639 B2
(45) Date of Patent: Sep. 3, 2024

(54) AUTOMATICALLY CHANGING DEVICE PROPERTY VALUES FOR A SECONDARY USER OF A DEVICE

(71) Applicant: Motorola Mobility LLC, Chicago, IL (US)

(72) Inventors: Mayank Rajesh Gupta, Naperville, IL (US); Nadeem Nazarali Panjwani, Chicago, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 398 days.

(21) Appl. No.: 17/220,789

(22) Filed: Apr. 1, 2021

(65) Prior Publication Data
US 2022/0318026 A1 Oct. 6, 2022

(51) Int. Cl.
| G06F 1/24 | (2006.01) |
| G06F 9/00 | (2018.01) |
| G06F 9/445 | (2018.01) |
| G06F 11/34 | (2006.01) |
| G06F 21/32 | (2013.01) |

(52) U.S. Cl.
CPC ........ *G06F 9/4451* (2013.01); *G06F 11/3438* (2013.01); *G06F 21/32* (2013.01)

(58) Field of Classification Search
CPC ..... G06F 9/4451; G06F 11/3438; G06F 21/32
See application file for complete search history.

(56) References Cited

U.S. PATENT DOCUMENTS

| 9,628,600 | B2 * | 4/2017 | Pratt | H04W 52/0254 |
| 10,135,869 | B2 * | 11/2018 | Tsuchitoi | H04W 12/086 |
| 2007/0204345 | A1 * | 8/2007 | Pereira | G06F 21/552 |
| | | | | 726/24 |
| 2010/0005526 | A1 * | 1/2010 | Tsuji | G06F 21/84 |
| | | | | 726/21 |
| 2011/0149159 | A1 | 6/2011 | Candelore et al. | |
| 2011/0206285 | A1 * | 8/2011 | Hodge | G06F 21/84 |
| | | | | 382/224 |
| 2012/0154847 | A1 * | 6/2012 | Ono | G06F 3/1285 |
| | | | | 358/1.14 |

(Continued)

OTHER PUBLICATIONS

U.S. Appl. No. 17/220,781, "Non-Final Office Action", U.S. Appl. No. 17/220,781, filed May 14, 2024, 20 pages.

*Primary Examiner* — Mohammed H Rehman
(74) *Attorney, Agent, or Firm* — FIG. 1 Patents

(57) ABSTRACT

A device property control system determines whether a current user of a device is an owner of the device, a trusted secondary user of the device, or an untrusted secondary user of the device. The system maintains device property values for the owner as well as each trusted secondary user of the device. When the current user of the device changes, the system determines whether the current user is the owner or a trusted secondary user and if so changes the device property values to those previously used by the owner or one of the trusted secondary users (whichever is the current user of the device). However, if the current user is an untrusted secondary user, the device property control system changes the device property values to demonstration mode device property values that are expected to best demonstrate the capabilities of the device.

20 Claims, 6 Drawing Sheets

(56) References Cited

U.S. PATENT DOCUMENTS

| | | | |
|---|---|---|---|
| 2015/0130709 A1* | 5/2015 | Dangi | G06F 3/0346 |
| | | | 345/156 |
| 2016/0323282 A1* | 11/2016 | Chen | H04L 63/0861 |
| 2017/0094049 A1 | 3/2017 | Kanevsky et al. | |
| 2017/0286031 A1* | 10/2017 | Matsui | G06F 3/1239 |
| 2018/0025335 A1* | 1/2018 | Flast | G06Q 20/321 |
| | | | 705/40 |
| 2019/0074003 A1 | 3/2019 | Guthery | |
| 2020/0236454 A1 | 7/2020 | He et al. | |
| 2020/0349296 A1* | 11/2020 | Young | G09C 5/00 |
| 2021/0058549 A1 | 2/2021 | Ji et al. | |
| 2021/0334459 A1 | 10/2021 | Dvijotham et al. | |
| 2022/0319352 A1 | 10/2022 | Gupta et al. | |

* cited by examiner

THE MOST POWERFUL MODEL EVER

ULTRA-POWERFUL PERFORMANCE

SUPERFAST 5G SPEED

AUTOMATICALLY CHANGING DEVICE PROPERTY VALUES FOR A SECONDARY USER OF A DEVICE

BACKGROUND

As technology has advanced, people have become increasingly reliant upon a variety of different computing devices, such as wireless devices (e.g., wireless phones or tablets). While these computing devices offer a variety of different benefits, they are not without their problems. One such problem is that users are able to set various different device property values for their devices, such as brightness level, allowing the owner of the device to configure the device in the manner they prefer. While this configuration is a benefit for the owner of the device, these devices are oftentimes shared with other users, such as family members, friends, or co-workers. In such situations the device property values may not be in accordance with the preferences of the other users, resulting in a poor user experience, such as because the brightness level is too low. Although the user may manually change the device property values, such changes may be difficult for the user to make if he or she is not familiar with the device, or may be contrary to the wishes of the owner. This can lead to user dissatisfaction and frustration with the devices by both the owner of the device and others that the owner shares the device with.

BRIEF DESCRIPTION OF THE DRAWINGS

Embodiments of automatically changing device property values for a secondary user of a device are described with reference to the following drawings. The same numbers are used throughout the drawings to reference like features and components.

DETAILED DESCRIPTION

Figure 1:
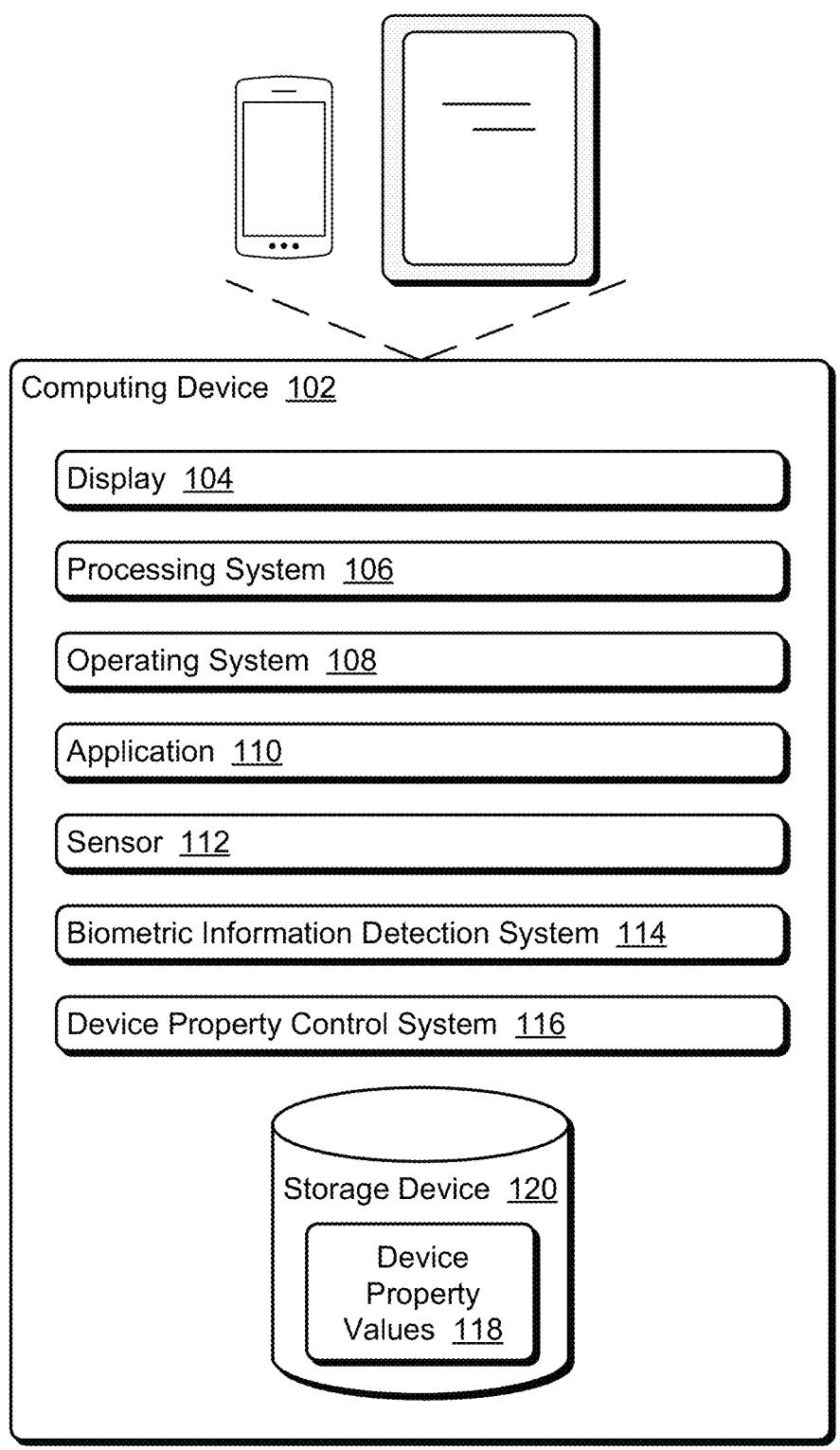
FIG. 1 illustrates an example computing device implementing the techniques discussed herein.

Automatically changing device property values for a secondary user of a device is discussed herein. A device property control system determines whether a current user of a device is an owner of the device or another (secondary) user. In one or more embodiments the current user of a device is a user that is in possession of (e.g., holding) the device. The secondary user is also referred to as a non-owner user. The owner of the device refers to a primary user of the device. The owner of the device typically is a user that has an account on the device and can log into the device (e.g., with a password, fingerprint identification, face identification, etc.). The owner of the device typically is, but need not be, the purchaser of the device (e.g., a company may pay for a device for an employee, and the employee is the primary user of the device and thus is referred to as the owner herein). The secondary user refers to another person that can use the device but need not, and typically does not, have an account on the device (and thus does not log into the device). The secondary user can be a trusted secondary user (e.g., a friend or family member of the owner of the device) or an untrusted secondary user (e.g., a new co-worker or acquaintance of the owner of the device).

The device property control system maintains device property values for the owner of the device as well as each trusted secondary user of the device. When the current user of the device changes, the device property control system determines whether the current user is the owner or a trusted secondary user and if so changes the device property values to those previously used or specified by the owner or one of the trusted secondary users (whichever is the current user of the device). However, if the current user is an untrusted secondary user, the device property control system changes the device property values to demonstration mode device property values that are expected (e.g., by a developer, manufacturer, or seller of the device) to best demonstrate the capabilities of the device. The demonstration mode device property values are, for example, the device property values that are typically set for the device when the device is being displayed in a retail setting. Additionally or alternatively, if the current user is an untrusted secondary user, the device property control system automatically changes the device to a demonstration mode in which the device runs a demonstration program displaying content that highlights or describes features of the device.

The techniques discussed herein improve usability of the device. The device property values for the owner of the device as well as trusted secondary users of the device are maintained and changed in response to which of the trusted secondary user or the owner is the current user of the device. Such users need not expend time or resources (e.g., battery life) navigating through various different settings screens to manually set the device property values each time they use the device.

Furthermore, the techniques discussed herein automatically set the device property values to values that are expected to best demonstrate the capabilities of the device when the current user is an untrusted secondary user. This ensures that a user that is potentially unfamiliar with the device is able to have a good experience using the device and need not expend time or resource (e.g., battery life) attempting to navigate through various different settings screens that the untrusted secondary user is unfamiliar with, reducing the initial friction for the untrusted secondary user caused due to owner-specified device property values.

FIG. 1 illustrates an example computing device 102 implementing the techniques discussed herein. The computing device 102 can be, or include, many different types of computing or electronic devices. For example, the computing device 102 can be a smartphone or other wireless phone, a camera (e.g., compact or single-lens reflex), or a tablet or phablet computer. By way of further example, the computing device 102 can be a notebook computer (e.g., netbook or ultrabook), a laptop computer, a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth.

The computing device 102 includes a display 104. The display 104 can be configured as any suitable type of display, such as an organic light-emitting diode (OLED) display, active matrix OLED display, liquid crystal display (LCD), in-plane shifting LCD, projector, and so forth. Although illustrated as part of the computing device 102, it should be noted that the display 104 can be implemented separately from the computing device 102. In such situations, the computing device 102 can communicate with the display 104 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. The display 104 can also optionally operate as an input device (e.g., the display 104 can be a touchscreen display).

The computing device 102 also includes a processing system 106 that includes one or more processors, each of which can include one or more cores. The processing system 106 is coupled with, and may implement functionalities of, any other components or modules of the computing device 102 that are described herein. In one or more embodiments, the processing system 106 includes a single processor having a single core. Additionally or alternatively, the processing system 106 includes a single processor having multiple cores and/or multiple processors (each having one or more cores).

The computing device 102 also includes an operating system 108. The operating system 108 manages hardware, software, and firmware resources in the computing device 102. The operating system 108 manages one or more applications 110 running on the computing device 102, and operates as an interface between applications 110 and hardware components of the computing device 102.

The computing device 102 also includes at least one sensor 112. The sensor 112 can be any of a variety of different types of sensors, such as an audio sensor (e.g., a microphone), a fingerprint sensor (e.g., a capacitive scanner, an optical scanner, an ultrasonic scanner, etc.), an image sensor (e.g., a charge-coupled device (CCD) sensor or a complementary metal-oxide-semiconductor (CMOS) sensor), a touchscreen (e.g., as part of the display 104 on one or more surfaces of the computing device 102), and so forth.

The computing device 102 also includes a biometric information detection system 114 and a device property control system 116. Each of the biometric information detection system 114 and the device property control system 116 can be implemented in a variety of different manners. For example, each of system 114 and 116 can be implemented as multiple instructions stored on computer-readable storage media and that can be executed by the processing system 106. Additionally or alternatively, each system 114 and 116 can be implemented at least in part in hardware (e.g., as an application-specific integrated circuit (ASIC), a field-programmable gate array (FPGA), and so forth). System 114 and 116 can each be implemented in the same manner, or each system 114 and 116 can be implemented in a different manner. Furthermore, although illustrated as separate from the operating system 108, one or more of the biometric information detection system 114 and the device property control system 116 can be implemented at least in part as part of the operating system 108.

Generally, the biometric information detection system 114 receives signals from the at least one sensor 112 and detects various biometric information regarding the current user of the computing device 102 in order to assist the device property control system 116 in recognizing the current user of the computing device 102. Various different biometric information can be detected by the biometric information detection system 114, such as voice information, face information, fingerprint information, grip information, and so forth.

In one or more embodiments, the current user of the computing device 102 is a user that is in possession of the computing device 102. A user being in possession of the computing device 102 refers to a user that is physically in control of or currently accessing the computing device 102. For example, the user that is holding the computing device 102 (e.g., with his or her hand) is the current user that is in possession of the computing device 102.

The biometric information detection system 114 detects various biometric information regarding the current user of the computing device 102. This biometric information can be, for example, information describing the user's voice, facial features, fingerprint features, grip on the computing device 102, and so forth. Any of a variety of different public or proprietary techniques can be used to obtain the biometric information, and the particular techniques implemented by the biometric information detection system 114 can vary based on the particular biometric information that is obtained by the biometric information detection system 114.

For example, facial features can be obtained from a current image captured by the sensor 112 and can include information regarding size and/or location of different aspects of a user's face, such as eyes, nose, mouth corners, ears, and so forth. By way of another example, fingerprint features can be obtained from the sensor 112 and can include information regarding the pattern of ridges or lines on one or more of the user's fingers. By way of another example, voice input can be captured by sensor 112 and can include information regarding different aspects of speech (e.g., phonemes) and the order and timing of the occurrence of those phonemes. By way of yet another example, touch features regarding how the user is touching or gripping the computing device 102 can be obtained from one or more sensors 112 that are touch sensors distributed around the computing device 102 (e.g., one or more pressure sensors, one or more capacitive sensors, one or more optical sensors, etc.) and can include information regarding the locations of the computing device 102 being touched by the user, an amount of force applied by the user in touching different locations of the computing device 102, and so forth.

The device property control system 116 determines whether the current user of the computing device 102 is an owner of the computing device 102 or a secondary user, and if a secondary user whether the secondary user is a trusted user. The device property control system 116 communicates with the operating system 108 to set various device property values in accordance with whether the current user is the owner or a secondary user of the computing device 102. Device property values 118 for various users are stored in a storage device 120. The storage device 120 can be implemented using any of a variety of storage technologies, such as magnetic disk, optical disc, Flash or other solid state memory, and so forth.

Figure 2:
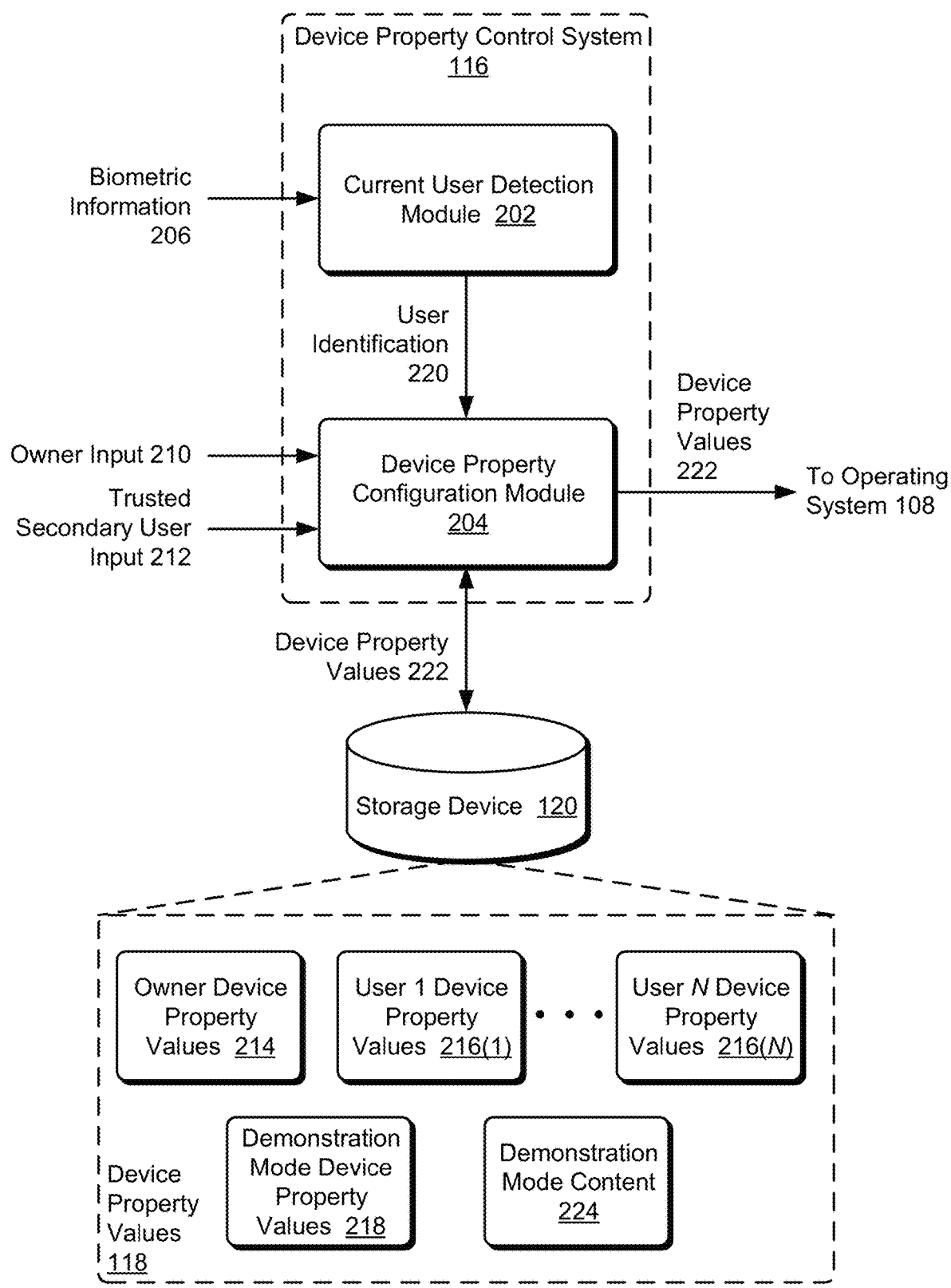
FIG. 2 illustrates an example architecture of the device property control system.

FIG. 2 illustrates an example architecture of the device property control system 116. The device property control system 116 includes a current user detection module 202 and a device property configuration module 204. The current user detection module 202 uses biometric information 206 obtained by the biometric information detection system 114 to determine whether the owner of the computing device 102 or a secondary user of the computing device 102 is the current user of the computing device 102. Furthermore, in one or more embodiments the current user detection module 202 uses, if the current user is a secondary user of the computing device 102, the biometric information 206 to determine whether the secondary user is a trusted user of the computing device 102. The current user detection module 202 can make these determinations in different manners based on the biometric information 206.

For example, the biometric information detected by the biometric information detection system 114 is compared to authentication information previously provided by the owner or trusted secondary user of the computing device 102 to determine whether the biometric information matches the authentication information. Whether the biometric information matches the authentication information can be determined in different manners, such as determining whether the biometric information is the same as the authentication information, determining whether there is at least a threshold probability (e.g., 90%) that the biometric information and the authentication information identify the same user, and so forth. If the biometric information matches the authentication information for the owner, then the current user detection module 202 determines that the owner is the current user. If the biometric information matches the authentication information for a trusted secondary user, then the current user detection module 202 determines that a trusted secondary user is the current user. If the biometric information does not match the authentication information for the owner or a trusted secondary user, then the current user detection module 202 determines that a secondary user that is not a trusted secondary user is the current user.

This authentication information can be provided to the computing device 102 in various manners. For example, for the owner of the computing device 102 the authentication information can be provided to the computing device 102 as part of a registration or login process. By way of another example, for a trusted secondary user of the computing device 102 the authentication information can be provided to the computing device 102 as the trusted secondary user uses the computing device 102. The authentication information is maintained by the computing device 102, such as in the storage device 120. By way of example, facial features or fingerprint features of the owner of the computing device 102 can be obtained and stored as part of a registration process for the owner of the computing device 102. By way of example, facial features or fingerprint features of a trusted secondary user of the computing device 102 can be obtained and stored while the trusted secondary user is using the computing device 102.

A secondary user being a trusted secondary user refers to the secondary user being trusted by the owner of computing device 102. Whether a secondary user is a trusted secondary user can be determined in various manners. For example, the owner of the computing device 102 can provide any of various inputs (e.g., a gesture, a voice command, a button selection) indicating to the current user detection module 202 that the next user of the computing device 102 is a trusted secondary user. This allows the owner of the computing device 102 to determine which secondary users are trusted secondary users and which are not trusted secondary users. By way of another example, the current user detection module 202 can determine that any secondary user that uses the computing device 102 at least a threshold number of times (e.g., five times) or uses the computing device with at least a threshold frequency (e.g., five times within one month) is a trusted secondary user. In these situations the current user detection module 202 can assume that the secondary user is a trusted secondary user because the owner allows the secondary user to use the computing device 102 frequently.

By way of another example, the current user detection module 202 can determine that any secondary user that uses the computing device 102 and is in the owner's contacts or favorites list (e.g., maintained by the computing device 102) is a trusted secondary user. In this situation the current user detection module 202 can assume that the secondary user is a trusted secondary user because the owner has added the secondary user to the contacts list or favorites list.

In one or more embodiments, the current user detection module 202 analyzes facial features detected by the biometric information detection system 114. The biometric information detection system 114 can identify a single face in a current captured image and determine facial features for that single face, or can identify multiple faces in the current captured image and determine facial features for each of those multiple faces. The current user detection module 202 compares the facial features to authentication information previously provided by the owner or trusted secondary user to determine whether the facial features in any of the faces detected by the biometric information detection system 114 match (e.g., are the same as, have at least threshold probability (e.g., 90%) of identifying the same user) the authentication information.

If multiple matches are found between a face in the current captured image and the authentication information for the owner or a trusted secondary user, then various different rules or criteria can be applied to determine whether the current user is the owner or is a trusted secondary user, or which of multiple trusted secondary users having authentication information matching faces in the current captured image is the current user. In one or more embodiments, if the authentication information for the owner matches a face in the image, then the owner is determined to be the current user. However, if no faces in the image match the authentication information for the owner but a single face in the image matches the authentication information for a trusted secondary user, then the trusted secondary user matching the face is the current user. Furthermore, if no faces in the image match the authentication information for the owner but multiple faces in the image each match the authentication information for a different trusted secondary user, then different rules are used to determine which of the different trusted secondary users is the current user, such as determining that the trusted secondary user that used the computing device 102 most recently is the current user, the trusted secondary user that used the computing device 102 most frequently or most times in the past is the current user, randomly or pseudo-randomly selecting one of the trusted secondary users to be the current user, and so forth.

Additionally or alternatively, the current user detection module 202 analyzes other features detected by the biometric information detection system 114. Examples of these other features, as discussed above, include fingerprint features, aspects of voice captured by the computing device 102, touch features regarding how the user is touching or gripping the computing device 102, and so forth. The current user detection module 202 compares the detected features to authentication information previously provided by the owner or trusted secondary user to determine whether the detected features match the authentication information. For example, the current user detection module 202 compares the detected features (fingerprint features or aspects of voice captured by the computing device 102, or touch features regarding how the user is touching or gripping the computing device 102) to authentication information previously provided by the owner to determine whether the detected features match (e.g., are the same as, have at least threshold probability (e.g., 90%) of identifying the same user) the authentication information for the owner. If a match is found between the detected features and the authentication information for the owner, then the owner is deemed to be the current user. If a match is not found between the detected features and the authentication information for the owner but a match is found between the detected features and the authentication information for a trusted secondary user, then the trusted secondary user is deemed to be the current user. If a match is not found between the authentication information for the owner or a trusted secondary user, then a secondary user that is not a trusted user is deemed to be the current user.

It should be noted that in some situations the computing device 102 allows for multi-user login, which refers to different users having different credentials or accounts allowing them to log into the computing device 102. The secondary user discussed herein is different from a user in a multi-user login situation. The secondary user discussed herein need not log into the computing device 102, and typically does not have an account on the computing device 102 to log into (the computing device 102 does not maintain login credentials for the secondary user). Nonetheless, the secondary user is still able to use the computing device 102 after the owner has logged into or unlocks the computing device 102.

The device property configuration module 204 controls setting and changing device property values on the computing device 102. The device property values refer to values or settings for any device properties involving the user interface of the computing device 102, such as display values, audio or sound values, interaction mode values, and so forth. Table I illustrates examples of device properties and their corresponding values. Although various device properties are included in Table I, additionally or alternatively a computing device 102 can have additional device properties or need not have all of the device properties included in Table I.

TABLE I

| Property | Values | Description |
|---|---|---|
| Brightness | Auto or between min and max values | Brightness of the device display |
| Dark Theme | Off/On | Dark colored text on a light background (off) or light colored text on a dark background (on) |
| Night Light | Off/On | When on, reduces the amount of blue light emitted by the device display to reduce eyestrain. |
| Adaptive Brightness | Off/On | When on, automatically adjusts the device display brightness based on ambient light level. |
| Screen Timeout | An amount of time | Turns off the device display after the amount of time elapses without user input to the device. |
| Auto Rotate | Off/On | Automatically rotates the screen between portrait and landscape modes based on orientation of the device. |
| Colors | Natural, Boosted, or Saturated | Changes the saturation of colors on the device display, from a lowest of Natural to a highest of Saturated. |

TABLE I-continued

| Property | Values | Description |
|---|---|---|
| System Navigation | Gesture, 2-button, or 3-button | Changes the input style for navigating through screens to be gesture only, 2 buttons, or 3 buttons. |
| Audio Effects | Off/On | When on, allows various equalizer settings for audio to be set. |
| Media Volume | Between min and max values | Controls the volume of content output (e.g., movies, video, audio in the web browser) by the device. |
| Ring and Notification Volume | Between min and max values | Controls the volume of the ring tone and notification tone on the device. |

The owner device property values 214 are initially set at default values, such as values that a developer, manufacturer, or seller of the computing device 102 determines to be typically or commonly used. The device property configuration module 204 receives owner input 210 that specifies one or more of the device property values for the computing device 102 that the owner prefers. The owner input 210 can be received via any of a variety of user inputs, such as gestures, selection of buttons or menu items, keyboard entries, voice commands, and so forth. The device property configuration module 204 maintains device property values for the owner as owner device property values 214 in storage device 120. Additional owner input 210 can be received over time and the device property configuration module 204 updates the owner device property values 214 accordingly.

Similarly, the owner device property values 214 are initially set at default values, such as values that a developer, manufacturer, or seller of the computing device 102 determines to be typically or commonly used. The device property configuration module 204 receives trusted secondary user input 212 that specifies one or more of the device property values for the computing device 102 that a trusted secondary user prefers. The trusted secondary user input 212 can be received via any of a variety of user inputs, such as gestures, selection of buttons or menu items, keyboard entries, voice commands, and so forth. The device property configuration module 204 maintains device property values for each of multiple (N) trusted secondary users as separate device property values in storage device 120, illustrated as user device property values (1), . . . , (N). Additional trusted secondary user input 212 for a trusted secondary user can be received over time and the device property configuration module 204 updates the user device property values 216 for the corresponding trusted secondary user accordingly.

The device property configuration module 204 also maintains demonstration mode device property values 218 on the storage device 120. The demonstration mode device property values 218 are device property values that are expected (e.g., by a developer, manufacturer, or seller of the computing device 102) to best demonstrate the capabilities of the computing device 102. For example, the demonstration mode device property values 218 may include a high screen brightness and saturated colors to display a bright and vivid screen. The demonstration mode device property values 218 are, for example, the device property values that are typically set for the computing device 102 when the computing device 102 is being displayed in a retail setting.

In one or more embodiments, the demonstration mode device property values 218 also include a value indicating to set the computing device 102 in a demonstration mode. The demonstration mode refers to a mode of operation in which the computing device 102 runs a demonstration program displaying content that highlights or describes features of the computing device 102. The demonstration program is, for example, a program that is typically run by the computing device 102 when the computing device 102 is being displayed in a retail setting. The content output by the demonstration program can take various forms, such as video, audio, a series of slides, and so forth. The demonstration program optionally allows users to interact with the computing device 102, such as by rewinding or fast forwarding through video or audio content, selecting different images or slides for display, and so forth.

The current user detection module 202 uses the biometric information to determine whether the current user of the computing device 102 is the owner, a trusted secondary user, or an untrusted secondary user as discussed above. The current user detection module 202 provides a user identification 220 to the device property configuration module 204 that identifies the current user of the computing device 102. This user identification 220 can take various forms, such as numbers, letters, or other characters. For example, the user identification for the owner may be the value 1, and each newly detected trusted secondary user may be a value 2 or greater (e.g., incrementing by 1 for each new trusted secondary user). The user identification 220 for an untrusted secondary user may be a default value, such as 0.

It should be noted that the user identification 220 need not, and typically does not, identify the actual identity of the trusted secondary users. Rather, the purpose of the user identification 220 is to allow different users to be distinguished from one another so that the appropriate device property values for the current user can be obtained from the storage device 120.

The device property configuration module 204 stores new user device property values 216 for each newly detected trusted secondary user as identified by user identification 220. The device property configuration module 204 maintains a record linking the user identification of each trusted secondary user to the corresponding user device property values 216. This record can be maintained in any of a variety of different manners, such as a table matching each user identification to a user device property value file or database record, including the user identification of the trusted secondary user in the file or database record that includes the corresponding user device property values 216, and so forth. Similarly, the device property configuration module 204 maintains a record linking the owner to the corresponding owner device property values 214 in any of a variety of different manners, such as a table matching the owner to an owner device property value file or database record, including the user identification of the owner in the file or database record that includes the owner device property values 214, and so forth.

Similarly, the device property configuration module 204 maintains a record linking an untrusted secondary user to the corresponding demonstration mode device property values 218 in any of a variety of different manners, such as a table matching the untrusted secondary user to demonstration mode device property value file or database record, including the user identification of the untrusted secondary user in the file or database record that includes the demonstration mode device property values 218, and so forth. In one or more embodiments, device property configuration module 204 maintains a single set of demonstration mode device property values 218 for all untrusted secondary users—different demonstration mode device property values 218 are not maintained for different untrusted secondary users.

In response to a change in the current user as indicated by the user identification 220, the device property configuration module 204 retrieves the corresponding device property values from the storage device 120 as device property values 222, and provides the retrieved device property values 222 to the operating system 108. This causes the operating system 108 to set the device properties for the computing device 102 to have the values as specified by the device property values 222.

As discussed above, owner input 210 and trusted secondary user input 212 can be received by device property configuration module 204 at various times. Owner input 210 is received while the owner is the current user of the computing device 102 and the device property configuration module 204 updates the owner device property values 214 based on the owner input 210. Trusted secondary user input 212 is received while a trusted secondary user is the current user of the computing device 102. In response to trusted secondary user input 212, the device property configuration module 204 updates the user device property values 216 corresponding to the current user as indicated by the user identification 220.

The storage device 120 also optionally maintains demonstration mode content 224. The demonstration mode content 224 is the content displayed by a demonstration program run by the operating system 108 when the computing device 102 is operating in a demonstration mode. In one or more embodiments, in response to determining that the current user is an untrusted secondary user, the device property configuration module 204 retrieves, as part of the device property values 222, the demonstration mode content 224, providing the operating system 108 with the demonstration content to use for the demonstration program. The demonstration mode content 224 can be provided to the operating system 108 in place of the demonstration mode device property values 218 or in addition to the demonstration mode device property values 218. Additionally or alternatively, the demonstration mode content 224 is the demonstration program that the operating system 108 is to run.

The device property control system 116 allows the owner of the computing device 102 as well as other trusted secondary users of the computing device 102 to specify their individual device property values and have the computing device 102 automatically configured with those specified device property values whenever he or she is the current user of the computing device 102. Furthermore, when the current user is an untrusted secondary user, the computing device 102 is automatically configured with device property values that are expected to best demonstrate the capabilities of the computing device 102.

Figure 3:
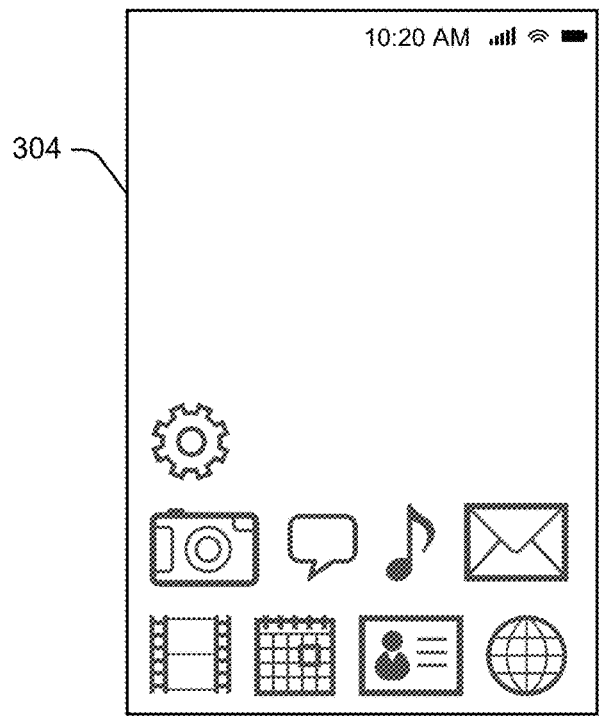
FIG. 3 illustrates an example of changing device property values.
Figure 3:
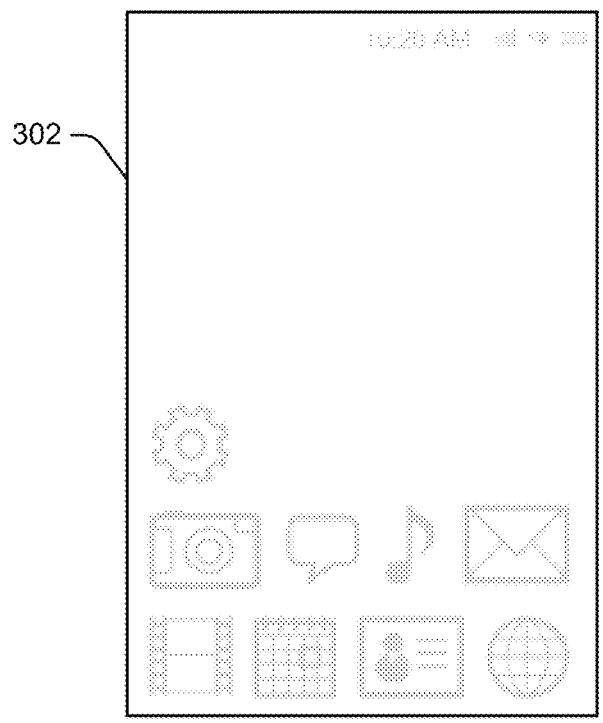

FIG. 3 illustrates an example of changing device property values. A screen 302 of a computing device 102 is illustrated including status indicators such as time, signal strength, and battery at the top. The screen 302 also includes icons at that represent applications or operating system programs that can be selected by the user for execution, such as a gear icon that represents a settings program (e.g., for user input of device property values), a camera icon that represents an image capture program, a speech balloon icon that represents a texting application, a music note icon that represents a music playback program, an envelope icon that represents an email application, a film strip icon that represents a video playback program, a calendar icon that represents a calendaring program, a business card icon that represents a contact list program, and a globe icon that represents a web browser.

In the illustrated example, assume the owner of the computing device 102 prefers the device display to have a lower brightness. Accordingly, the brightness device property value for the owner is set to a low value, resulting in the icons being displayed at a low brightness level as illustrated by the screen 302 when the owner is the current user of the computing device. However, if the owner hands the computing device 102 to another user that is an untrusted secondary user, the brightness device property value is changed to the demonstration mode device property values that include a high screen brightness. This results in the icons being displayed at a high brightness level as illustrated by the screen 304 when the untrusted secondary user is the current user of the computing device 102. When the computing device 102 is handed back to the owner, the brightness device property value is changed back to a low value, resulting in the icons again being displayed at a low brightness level as illustrated by the screen 302.

Figure 4:
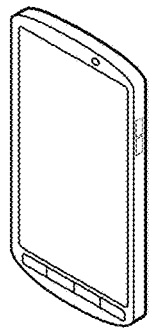
FIG. 4 illustrates an example of demonstration mode content.
Figure 4:
Figure 4:
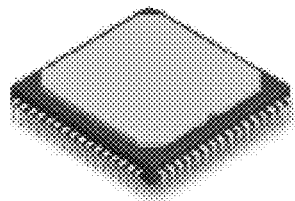
Figure 4:
Figure 4:
Figure 4:

FIG. 4 illustrates an example of demonstration mode content. FIG. 4 illustrates three slides in a series of several slides that are displayed when running the demonstration program. In one or more embodiments, each slide in the series is displayed for a certain amount of time (e.g., five or ten seconds) and then the next slide in the series is displayed, looping back to the first slide in the series after the last slide has been displayed. Additionally or alternatively, user input may be received for the demonstration program to scroll backwards through the slides or forwards at a different rate (or to a particular slide by selecting the circle at the bottom corresponding to the desired slide).

A slide 402 is displayed including an image of the computing device (a mobile phone in this example) and a description indicating that the computing device is the most power model ever. A "watch it" button is included that is user-selectable to have the demonstration program play a video describing the computing device. A sequence of circles is included at the bottom to illustrate how many slides are in the series and which slide the slide 402 is. In the illustrated example, six circles indicate there are six slides and the first circle being filled in indicates that slide 402 is the first slide in the series of six slides.

A slide 404 is displayed including an image of a processor of the computing device and a description indicating that the processor provides ultra-powerful performance. A "learn more" button is included that is user-selectable to have the demonstration program display additional information describing the processor. The sequence of circles at the bottom indicates that slide 404 is the second slide in the series of six slides.

A slide 406 is displayed including an image of a tower and indication of 5G along with a description indicating that the computing device provides superfast 5G speed. A "learn more" button is included that is user-selectable to have the demonstration program display additional information describing the 5G capabilities of the computing device. The sequence of circles at the bottom indicates that slide 406 is the third slide in the series of six slides.

Figure 5:
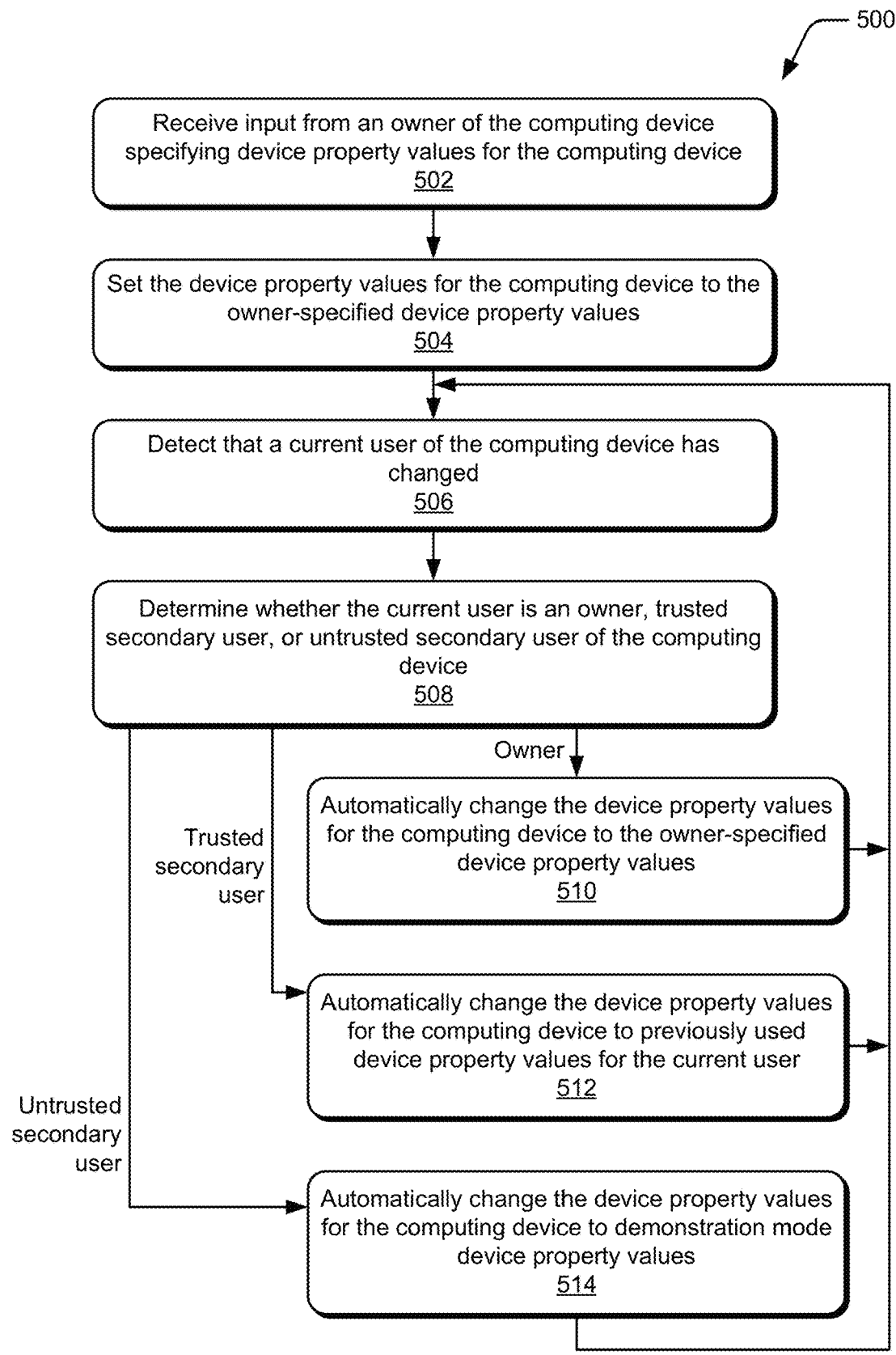
FIG. 5 illustrates an example process for implementing the techniques discussed herein in accordance with one or more embodiments.

FIG. 5 illustrates an example process 500 for implementing the techniques discussed herein in accordance with one or more embodiments. Process 500 is carried out by one or more systems such as a biometric information detection system 114 or device property control system 116 of FIG. 1, and can be implemented in software, firmware, hardware, or combinations thereof. Process 500 is shown as a set of acts and is not limited to the order shown for performing the operations of the various acts.

In process 500, input is received from the owner of a computing device specifying device property values for the computing device (act 502). The owner can specify values for any of a variety of different device properties.

The device property values for the computing device are set to the owner-specified device property values (act 504). This occurs while the owner of the computing device is the current user of the computing device.

A change in the current user of the computing device is detected (act 506). The current user of the computing device can vary at different times, and can be the owner of the computing device, a trusted secondary user of a set of one or more trusted secondary users of the computing device, or an untrusted secondary user of the computing device.

A determination is made as to whether the current user is the owner, a trusted secondary user, or an untrusted secondary user of the computing device (act 508). This determination is made based on various biometric information as discussed above.

In response to determining that the current user is the owner of the computing device, the device property values for the computing device are automatically changed to the owner-specified device property values (act 510). The process then returns to act 506, keeping the device property values as the owner-specified device property values until there is a change in the current user of the computing device.

In response to determining that the current user is a trusted secondary user of the computing device, the device property values for the computing device are automatically changed to the device property values for that trusted secondary user (act 512). The process then returns to act 506, keeping the device property values as the device property values for that trusted secondary user until there is a change in the current user of the computing device.

In response to determining that the current user is an untrusted secondary user of the computing device, the device property values for the computing device are automatically changed to the demonstration mode device property values user (act 514). The process then returns to act 506, keeping the device property values as the demonstration mode device property values until there is a change in the current user of the computing device.

Figure 6:
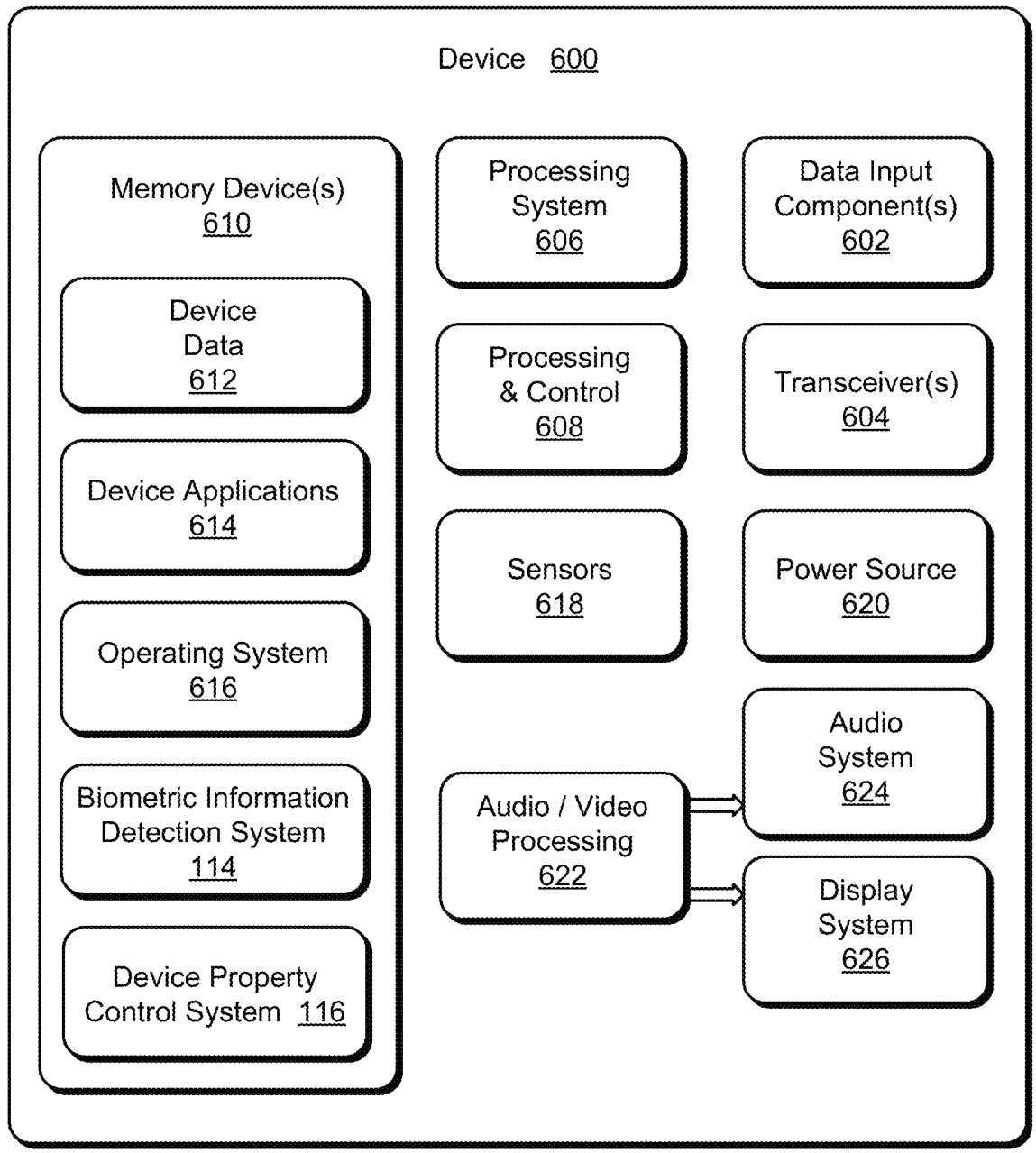
FIG. 6 illustrates various components of an example electronic device that can implement embodiments of the techniques discussed herein.

FIG. 6 illustrates various components of an example electronic device that can implement embodiments of the techniques discussed herein. The electronic device 600 can be implemented as any of the devices described with reference to FIGS. 1-5, such as any type of client device, mobile phone, tablet, computing, communication, entertainment, gaming, media playback, or other type of electronic device.

The electronic device 600 includes one or more data input components 602 via which any type of data, media content, or inputs can be received such as user-selectable inputs, messages, music, television content, recorded video content, and any other type of text, audio, video, or image data received from any content or data source. The data input components 602 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 602 may also include various other input components such as microphones, touch sensors, touchscreens, keyboards, and so forth.

The device 600 includes communication one or more transceivers 604 that enables one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 600 includes a processing system 606 of one or more processors (e.g., any of microprocessors, controllers, and the like) or a processor and memory system implemented as a system-on-chip (SoC) that processes computer-executable instructions. The processing system 606 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Additionally or alternatively, the device can be implemented with any one or combination of software, hardware, firmware, or fixed logic circuitry that is implemented in connection with processing and control circuits, which are generally identified at 608. The device 600 may further include any type of a system bus or other data and command transfer system that couples the various components within the device. A system bus can include any one or combination of different bus structures and architectures, as well as control and data lines.

The device 600 also includes computer-readable storage memory devices 610 that enable data storage, such as data storage devices that can be accessed by a computing device, and that provide persistent storage of data and executable instructions (e.g., software applications, programs, functions, and the like). Examples of the computer-readable storage memory devices 610 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory device 610 provides data storage mechanisms to store the device data 612, other types of information or data, and various device applications 614 (e.g., software applications). For example, an operating system 616 can be maintained as software instructions with a memory device and executed by the processing system 606. The device applications 614 may also include a device manager, such as any form of a control application, software application, signal-processing and control module, code that is native to a particular device, a hardware abstraction layer for a particular device, and so on.

In one or more embodiments the electronic device 600 includes a biometric information detection system 114 and a device property control system 116, described above. Although represented as a software implementation, one or both of the biometric information detection system 114 and the device property control system 116 may be implemented as any form of a control application, software application, signal processing and control module, firmware that is installed on the device 600, a hardware implementation of the modules, and so on.

The device 600 can also include one or more device sensors 618, such as any one or more of an ambient light sensor, a proximity sensor, a touch sensor, an infrared (IR) sensor, an accelerometer, a gyroscope, a thermal sensor, an audio sensor (e.g., microphone), a fingerprint sensor, an image sensor (e.g., a CCD sensor or a CMOS sensor), and the like. The device 600 can also include one or more power sources 620, such as when the device 600 is implemented as a mobile device. The power sources 620 may include a charging or power system, and can be implemented as a flexible strip battery, a rechargeable battery, a charged super-capacitor, or any other type of active or passive power source.

The device 600 additionally includes an audio or video processing system 622 that generates one or both of audio data for an audio system 624 and display data for a display system 626. In accordance with some embodiments, the audio/video processing system 622 is configured to receive call audio data from the transceiver 604 and communicate the call audio data to the audio system 624 for playback at the device 600. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for implementing automatically changing device property values for a secondary user of a device have been described in language specific to features or methods, the subject of the appended claims is not necessarily limited to the specific features or methods described. Rather, the specific features and methods are disclosed as example implementations of techniques for implementing automatically changing device property values for a secondary user of a device.

A method implemented in a computing device, the method comprising: receiving input from an owner of the computing device specifying device property values for the computing device; setting the device property values for the computing device to the owner-specified device property values; detecting that a current user of the computing device has changed; determining that the current user of the computing device is a secondary user that is not the owner; determining whether the current user is a trusted secondary user of the computing device; and automatically changing, in response to determining that the current user is not the trusted secondary user of the computing device, the device property values to demonstration mode device property values.

Alternatively or in addition to the above described method, any one or combination of the following. The method further comprising: subsequently determining that the current user of the computing device has changed to be the owner of the computing device; and automatically changing, in response to determining that the current user has changed to be the owner of the computing device, the device property values to the owner-specified device property values. The method further comprising, in response to determining that the current user is the trusted secondary user of the computing device: retrieving previously used device property values for the current user; and automatically changing the device property values to the previously used device property values by the current user. The device property values including one or more of display values, gesture values, and sound values. The determining that the current user is the secondary user including determining that the current user of the computing device is the secondary user based on biometric recognition of the current user or grip detection of the current user. The determining whether the current user is the trusted secondary user including checking a frequency with which the current user uses the computing device, and determining that the current user is the trusted secondary user in response to the frequency with which the current user uses the computing device satisfying a threshold frequency. The demonstration mode device property values including device property values that are expected to best demonstrate capabilities of the computing device. The demonstration mode device property values including a value indicating to set the computing device in a demonstration mode, and the method further comprising automatically running on the computing device, in response to the value indicating to set the computing device in the demonstration mode, a demonstration program that highlights features of the computing device.

A computing device comprising: a processor; and a computer-readable storage medium having stored thereon multiple instructions that, responsive to execution by the processor, cause the processor to perform acts including: receiving input from an owner of the computing device specifying device property values for the computing device; setting the device property values for the computing device to the owner-specified device property values; detecting that a current user of the computing device has changed; determining that the current user of the computing device is a secondary user that is not the owner; determining whether the current user is a trusted secondary user of the computing device; and in response to determining that the current user is the trusted secondary user of the computing device: retrieving previously used device property values for the current user, and automatically changing the device property values to the previously used device property values for the current user.

Alternatively or in addition to the above described computing device, any one or combination of the following. The acts further including: subsequently determining that the current user of the computing device has changed to be the owner of the computing device; and automatically changing, in response to determining that the current user has changed to be the owner of the computing device, the device property values to the owner-specified device property values. The determining that the current user is the trusted secondary user including determining that the current user of the computing device is the trusted secondary user based on biometric information of the current user or grip detection of the current user. The determining whether the current user is the trusted secondary user including checking a frequency with which the current user uses the computing device, and determining that the current user is the trusted secondary user in response to the frequency with which the current user uses the computing device satisfying a threshold frequency. The device property values including one or more of display values, gesture values, and sound values.

An electronic device comprising: a sensor; a storage device configured to maintain owner-specified device property values to demonstration mode device property values; and a device property control system, implemented at least in part in hardware, the device property control system including: a current user detection module configured to determine whether a current user of the computing device is an owner of the computing device or a secondary user of the computing device that is a trusted secondary user of the computing device; and a device property configuration module configured to automatically change, in response to determining that the current user is the secondary user of the computing device and is not a trusted secondary user of the computing device, device property values of the computing device from the owner-specified device property values to the demonstration mode device property values.

Alternatively or in addition to the above described electronic device, any one or combination of the following. The demonstration mode device property values including device property values that best demonstrate capabilities of the computing device. The device property values including one or more of display values, gesture values, and sound values. The demonstration mode device property values including a value indicating to set the computing device in a demonstration mode, and the device property configuration module being further configured to automatically run on the computing device, in response to the computing device being in the demonstration mode, a demonstration program that highlights features of the computing device. The current user detection module being configured to determine that the current user is the secondary user based on biometric information of the current user or grip detection of the current user. The current user detection module being configured to determine that the current user is the trusted secondary of the computing device in response to a frequency with which the current user uses the computing device satisfying a threshold frequency. The current user detection module being further configured to subsequently determine that the current user of the computing device has changed to be the owner of the computing device, and the device property configuration module being further configured to automatically change, in response to determining that the current user has changed to be the owner of the computing device, the device property values to the owner-specified device property values.

What is claimed is:

1. A method implemented in a computing device, the method comprising:
   receiving an input from an owner of the computing device that includes owner-specified device property values for the computing device, the owner-specified device property values including at least one gesture value preferred by the owner;
   setting device property values for the computing device to the owner-specified device property values;
   detecting that a current user of the computing device has changed;
   determining that the current user of the computing device is a secondary user that is not the owner;
   determining whether the current user is a trusted secondary user of the computing device; and
   automatically changing, in response to determining that the current user is not the trusted secondary user of the computing device, the device property values to demonstration mode device property values including at least one demonstration mode gesture value.

2. The method of claim 1, further comprising:
subsequently determining that the current user of the computing device has changed to be the owner of the computing device; and
automatically changing, in response to determining that the current user has changed to be the owner of the computing device, the device property values to the owner-specified device property values.

3. The method of claim 1, further comprising, in response to determining that the current user is the trusted secondary user of the computing device:
retrieving previously used device property values for the current user; and
automatically changing the device property values to the previously used device property values by the current user.

4. The method of claim 1, the device property values further include one or more display values or sound values.

5. The method of claim 1, the determining that the current user is the secondary user including determining that the current user of the computing device is the secondary user based on biometric recognition of the current user or grip detection of the current user.

6. The method of claim 1, the determining whether the current user is the trusted secondary user including checking a frequency with which the current user uses the computing device, and determining that the current user is the trusted secondary user in response to the frequency with which the current user uses the computing device satisfying a threshold frequency.

7. The method of claim 1, the demonstration mode device property values including device property values that are expected to best demonstrate capabilities of the computing device.

8. The method of claim 1, the demonstration mode device property values including a value indicating to set the computing device in a demonstration mode, and the method further comprising automatically running on the computing device, in response to the value indicating to set the computing device in the demonstration mode, a demonstration program that highlights features of the computing device.

9. The method of claim 1, wherein the at least one demonstration mode gesture value controls an input style for navigating through display screens of the computing device.

10. A computing device comprising:
a processor; and
a non-transitory computer-readable storage medium having stored thereon multiple instructions that, responsive to execution by the processor, cause the processor to perform acts including:
receiving an input from an owner of the computing device that includes owner-specified device property values for the computing device, the owner-specified device property values including at least one gesture value;
setting device property values for the computing device to the owner-specified device property values;
detecting that a current user of the computing device has changed;
determining that the current user of the computing device is a secondary user that is not the owner;
determining whether the current user is a trusted secondary user of the computing device; and
in response to determining that the current user is the trusted secondary user of the computing device:
retrieving previously used device property values for the current user including at least one gesture value for the current user; and
automatically changing the device property values to the previously used device property values for the current user including the at least one gesture value for the current user.

11. The computing device of claim 10, the acts further including:
subsequently determining that the current user of the computing device has changed to be the owner of the computing device; and
automatically changing, in response to determining that the current user has changed to be the owner of the computing device, the device property values to the owner-specified device property values.

12. The computing device of claim 10, the determining that the current user is the trusted secondary user including determining that the current user of the computing device is the trusted secondary user based on biometric information of the current user or grip detection of the current user.

13. The computing device of claim 10, the determining whether the current user is the trusted secondary user including checking a frequency with which the current user uses the computing device, and determining that the current user is the trusted secondary user in response to the frequency with which the current user uses the computing device satisfying a threshold frequency.

14. The computing device of claim 10, wherein the device property values further include at least one display value and at least one sound value.

15. An electronic device comprising:
a sensor;
a storage device configured to maintain owner-specified device property values and demonstration mode device property values; and
a device property control system, implemented at least in part in hardware, the device property control system including:
a current user detection module configured to determine whether a current user of the electronic device is an owner of the electronic device or a secondary user of the electronic device that is a trusted secondary user of the electronic device; and
a device property configuration module configured to automatically change, in response to determining that the current user is the secondary user of the electronic device and is not a trusted secondary user of the electronic device, device property values of the electronic device from the owner-specified device property values to demonstration mode device property values that include a value indicating to automatically run a demonstration program on the electronic device that displays one or more slides that include content that describes features of the electronic device.

16. The electronic device of claim 15, the demonstration mode device property values including display values, gesture values, and sound values that best demonstrate capabilities of the electronic device.

17. The electronic device of claim 15, the demonstration program including a plurality of slides that include content that highlights features of the electronic device.

18. The electronic device of claim 15, the current user detection module being configured to determine that the current user is the secondary user based on biometric information of the current user or grip detection of the current user.

19. The electronic device of claim 15, the current user detection module being configured to determine that the current user is the trusted secondary user of the electronic device in response to a frequency with which the current user uses the electronic device satisfying a threshold frequency.

20. The electronic device of claim 15, the current user detection module being further configured to subsequently determine that the current user of the electronic device has changed to be the owner of the electronic device, and the device property configuration module being further configured to automatically change, in response to determining that the current user has changed to be the owner of the electronic device, the device property values to the owner-specified device property values.

* * * * *